United States Patent Office 3,056,596
Patented Oct. 2, 1962

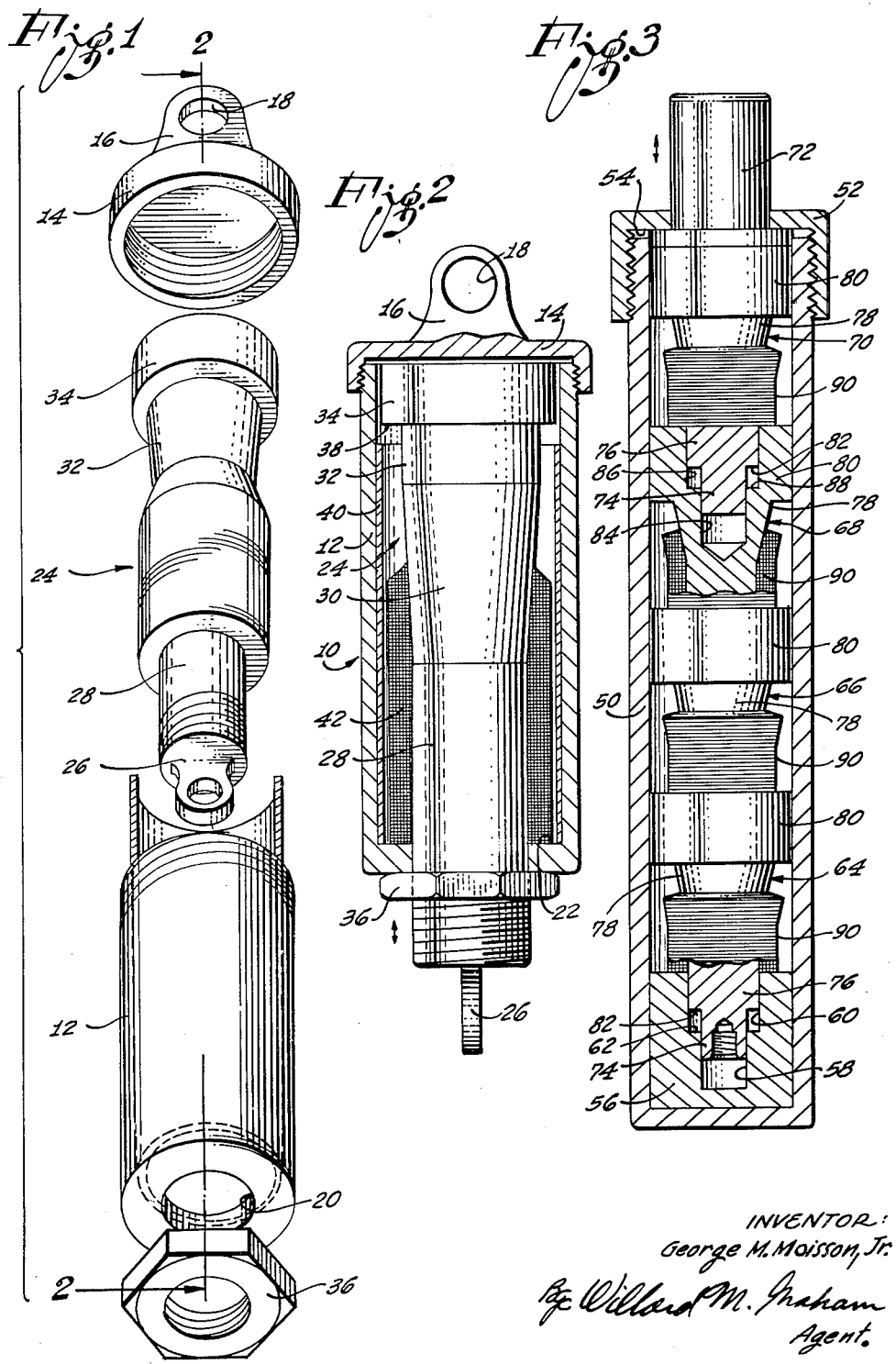

3,056,596
SHOCK ABSORBER
George M. Moisson, Jr., Palos Verdes Estates, Calif., assignor to Northrop Corporation, Beverly Hills, Calif., a corporation of California
Filed May 9, 1960, Ser. No. 27,885
5 Claims. (Cl. 267—1)

This invention has to do with mechanical, pressure sensitive equipment and more particularly with shock absorbers that may be applied in a variety of ways.

Heretofore shock absorbers were subjected to environments that tended to accelerate malfunctions and wear. These environments included dirt that tended to filter into the cylinder or shock absorber housing and when oil or other types of liquid materials were used there would be a tendency to score the close tolerance components. Also, shock absorbers, as good as they were, would not, under most conditions, repeat exactly their function each time loads or forces were applied.

It is an object of this invention to provide a shock absorber that translates linear motion and force into a circumferential expansion of a monofilament coiled about a portion of a conic section that is an integral part of a cylindrical shaft or piston.

Another object of this invention is to provide a shock absorber having a spindle that includes a conic section about which a monofilament is wound and which, in combination, determines the forces that may be applied or exerted.

A yet further object of this invention is to provide within a shock absorber a spindle having a conic section, the taper, in part, being a determining factor with respect to the forces that may be applied or exerted.

Another object of this invention is to provie a shock absorber having a monofilament wound about a portion of a cylinder and conic section, which monofilament, in part, determines, through the medium of winding tension, composition, size, and area covered, the forces that may be applied or exerted.

A yet further object of this invention is to provide a shock absorber that has certain of the essential components thereof under prestressed conditions.

A still further object of this invention is to provide a shock absorber that, except for normal conditions, does not have certain essential components under prestressed conditions.

A still further object of this invention is to provide a shock absorber that will be repeatedly affected by substantially the same forces.

Another object of this invention is to provide a shock absorber that under predetermined conditions is destructible in one operation, but is readily repaired for continued operation.

A further object of this invention is to provide a shock absorber that includes a series of shock absorbers aligned in a cascading relationship, each one of which is operable when different forces are applied thereto.

A yet further object of this invention is to provide a shock absorber that is economical to fabricate, is made of readily available materials, and is subject to mass production techniques.

Briefly this invention comprises a reciprocable spindle located within a housing which is closed at one end and apertured at the opposed end. The spindle includes a conic and cylindrical section. About a portion of each of the sections is wrapped a monofilament material that may or may not be prestressed.

FIGURE 1 is a perspective, exploded view illustrating and having embodied therein the present invention.

FIGURE 2 is a cross-sectional view taken on line 2—2 of FIGURE 1.

FIGURE 3 is a cross-sectional view illustrating a shock absorber wherein a series of shock absorbers are assembled in a cascading relationship.

Referring to the drawings for a more detailed description of the present invention 10 broadly designates a cylindrical, spindle housing, body, cup or the like. Threaded onto a hollow cylinder 12, of the housing 10, and closing one end thereof is a cap 14 that has integral therewith a projection 16. An opening 18 is in the projection and through the medium of this structure one end of the housing may be attached to certain other applicable equipment.

That end of the cylinder 12, in opposed relationship to the cap 14, is apertured or has an opening 20 therein. The opening diameter is less than the diameter of the cylinder 12 which results in defining an internal seat or shoulder 22.

A spindle, broadly designated 24, is reciprocal in the housing 10. Five major and integral components constitute the spindle, an apertured projection 26, an elongated cylindrical portion 28, a conic section 30, another cylindrical portion 32, and a head 34.

It may be determined, by referring to FIGURE 2, that the elongated cylindrical portion or section 28 has a portion thereof that extends through the opening 20 and is externally threaded to receive a stop, lock, or adjusting nut 36.

The projection 26 like projection 16 is adapted to be attached to other structure that may impose or exert a force on the spindle to cause its reciprocation.

Also it is to be noted that the cylindrical section 32 has a greater diameter than cylindrical section 28 and that the head, being cylindrical, is larger than section 32 which results in defining an annular flange or shoulder 38.

Located within the cylinder 12 is a stop sleeve 40, one end of which rests or seats on shoulder 22. When the spindle 24 is caused to move, in one direction, shoulder 38 contacts that end of the sleeve nearest thereto to limit the movement thereof. However, under a given set of circumstances, to be described, the sleeve is not considered necessary and may not be present.

Wrapped about a major portion of cylindrical section 28, a slidable thereon, and seating on shoulder 22 is a nylon monofilament fiber 42 or other equally applicable monofilament material. This monofilament fiber is also wrapped about a portion of the conic section 30 and slidable thereon. In order to reduce the amount of friction, if considered desirable, the entire spindle, or sections 28 and 30, may be coated with Teflon which, as is well known, has lubricating properties.

Nylon and other monofilament fibers have very good elastic properties. Nylon, being the one here under consideration, has an elastic property that is approximately 20% of its normal unstretched length. In other words, if the fiber is 20 inches long it will stretch another four inches before it fractures or obtains a permanent set. Under a predetermined set of circumstances, to be hereinafter defined, the 20% stretch factor is not to be exceeded and for purposes of obtaining positive repeatability of operation only about 10% of the stretch factor should be utilized. Of course the stretch factor will vary with each monofilament material.

Several conditions dictate the forces, shocks, or loads that may be absorbed by the shock absorber. These conditions all may be related to the monofilament 42 and the conic section 30. For instance, the amount of load the shock absorber may assume can be controlled by the amount of tension that is applied to the monofilament when it is wrapped about sections 28 and 30. Also the number of layers of monofilament, as well as the diameter size must be considered. Further, how much of the conic section has a monofilament wrapped thereabout also must be considered, and of course the monofilament itself varies from one type to another.

Another factor that dictates the effective load absorbing properties of the invention is the degree of taper of the conic section 30. When the degree of taper is small the spindle will move further and, generally, less load absorption will be obtained. Also if the taper is large more absorption will be obtained. However, both the degree of taper of conic section 30 and the monofilament wrapping 42 must be considered together and not separately in order to establish the load supporting or absorbing properties.

Another physical property that has a bearing on the load supporting qualities of the shock absorber is the amount of friction between the spindle and coil of monofilament.

The operation of that form of invention illustrated in FIGURES 1 and 2 is as follows: A monofilament is wrapped about a portion of cylindrical section 28 and conical section 30 of the spindle 24 in the form of a coil 42. The coil seats on shoulder 22.

For purposes of this explanation it will be assumed that the stop sleeve 40 is not in cylinder 12.

In application it is assumed that a load is applied to the spindle 24 through the medium of apertured projections 16 and 26. Applying a load in the above manner moves the spindle from its initial or no-load position, as shown in FIGURE 3, to a final or loaded position (not shown). As a result of the spindle's movement from its no-load to its loaded position, the conic section 30 is pulled into the coil 42. This results in the windings, adjacent the top portion of the coil 42, being linearly expanded and concurrently the entire coil is compressed in a longitudinal direction. At this time the condition of the coil is referred to as being in an "expanded-compressed" condition. At such time as no-load is applied to the spindle 24 the condition of the coil is referred to as its "nonexpanded-noncompressed" condition. The aforementioned load may be designed to exceed the monofilament elastic properties which will result in a fracture thereof or result in the monofilament taking a set resulting in the condition that it will not return to its original condition. Under these operating conditions the shock absorber is designed as a safety factor device to be used only once. In order to use it again the spindle must be removed and the coil 42 rewrapped.

However, assume the same conditions where the load imposed does not exceed the elastic properties of the monofilament coil. Previously a load may be applied which results in the coil assuming a new position with respect to sections 28 and 30. For instance, a preload condition may be applied. The coil 42 shifts its position or is caused to slide up onto the conic section and is spaced from the shoulder 22. The preload forces are not great enough to introduce sufficient compression forces into the coil which will in turn result in squeezing the spindle back to its original position. As a result, when a load is applied to spindle 24 there is a delay before the shock or load is absorbed by the coil and spindle due to the fact that it must bottom first.

Consider further the operation where again preload condition is placed on the coil 42. Again it is spaced from shoulder 22. In order to bring it back into a contact or seating position, with respect to the shoulder, the space is taken up by adjusting nut 36. Under these conditions the coil is preloaded or prestressed.

A load is applied to the prestressed coil. The conic section 30 is pulled down into the coil to absorb the load and the coil is caused to expand or stretch. When the load is released the compression forces that have built up in the coil squeeze the conic section and spindle back to their original position with the coil remaining bottomed on shoulder 22. It has been determined that the shock absorber will repeat, exactly, its load absorbing qualities time after time without any noticeable wear or damage.

Further, in order to assure that the imposed load does not exceed the elastic properties of the prestressed or preloaded coil, the stop sleeve 40 is introduced. The length of the sleeve, of course, is dictated by the load that may be exerted on the coil 42. To protect the coil 42 against fracture and damage shoulder 38 is made to bottom on the stop sleeve 40.

Consider now that form of invention illustrated in FIGURE 3. There is an elongated cylinder housing 50 which is closed at one end. A cap 52 having an opening therein is threaded onto the housing 50. The diameter of the opening in the cap is less than the diameter of the cap which results in defining a shoulder or seat 54. Located in the bottom of the housing 50, in opposed relationship to the cap 52, is a plug 56. A pair of concentric bores 58 and 60 are centrally located in the plug, which define a stop shoulder 62.

Reciprocable in housing 50 are a plurality of spindles 64, 66, 68, and 70 all of which are identical except spindle 70 which has a button 72 thereon which projects through the opening in cap 52.

Due to the fact that each spindle is substantially identical to the other, only one will be described.

Each spindle comprises four major units, a cylindrical projection 74, a larger cylindrical section 76, a conical section 78, and a head 80. Projection 74 has a smaller diameter, but is concentric with section 76 which results in defining a shoulder 82. Projection 74 extends into bore 58 and a portion of cylindrical section 76 extends into bore 60, FIGURE 3.

Each head 80 with the exception of the head on spindle 70, has a pair of concentric bores 84 and 86 therein which also define stop shoulders 88. Each bore 84 is to receive the adjacent projection 74 and each bore 86 is to receive a portion of cylindrical section 76 and shoulder 82 bottoms on the adjacent stop shoulder 88.

Again a coil 90 of a monofilament material is wrapped about a portion of cylindrical section 76 and conic section 78. The head 80 of each spindle, with the exception of spindle 70, functions as a seat for the coil 90. The coil 90 of spindle 64 seats on the plug 56.

All the conditions and variations of conic sections and coils that are applied to that form of the invention illustrated in FIGURES 1 and 2 are also applicable to the spindles in FIGURE 3.

The operation of that form of invention illustrated in FIGURE 3 is as follows: Assume that coil and conic section of spindle 70 is designed to start operating at 50 pounds and has finished the downward stroke at 100 pounds and each coil and conic section of each succeeding spindle is designed to function in identical increasing increments.

A beginning load of 50 pounds is applied to button 72 which results in initiating the downward movement of spindle 70 which results in forcing conic section 78 into the coil 90. When 100 pounds is attained shoulder 82, of spindle 70, bottoms on shoulder 88. At this moment additional loads are exerted on spindle 68 until 150 pounds is attained when shoulder 82 of spindle 68 bottoms again on shoulder 88. This condition of increasing loads continues until shoulder 82, of spindle 64, bottoms on shoulder 62 of the plug 56.

Release of the load results in the coils 90 squeezing, by compressive forces, the spindles back to the position illustrated in FIGURE 3.

The preceding description is applicable when the coils 90 are in the preloaded or prestressed condition. However, all the conditions that were applicable to that form of the invention illustrated in FIGURES 1 and 2 are also applicable to that form of invention illustrated in FIGURE 3.

It may be stated with respect to all forms of the invention shown and described that the conic section of the spindle is the critical unit. The force needed to draw the cone or conic section into the coil is directly proportional to the angle of taper. Also the invention may be defined as a device that translates linear motion into a circumferential expansion of a monofilament coil by means of a conic section.

While, in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A shock absorber comprising: an elongated body having a passageway extending therethrough in a longitudinal direction; a spindle including a conic and cylindrical section; a single thread-like resilient monofilament element wound about a portion of said conic and cylindrical section to define an elastic body having a cylindrical-like configuration; said spindle being mounted in said passageway for reciprocal movement therein between loaded and non-loaded positions in which said coil experiences compressed-expanded and noncompressed-nonexpanded conditions, respectively; the outside diameter of said elastic body in its noncompressed-nonexpanded condition having a diameter which is less than the minimum cross-sectional measurement of said passageway; and fixed means in said body contacting said elastic body and precluding movement thereof in one direction as said spindle is reciprocally moved in said passageway.

2. A shock absorber as set forth in claim 1: in which the taper of the conical portion of said conic and cylindrical section is such that, at such time as the spindle is urged from its no-load to its loaded position, the length of any individual winding of said coil is not increased more than twenty percent of its unstretched length.

3. A shock absorber comprising: an elongated housing; said housing being closed at one end and apertured at the other and having a passageway extending therethrough in a longitudinal direction; a plurality of spindles each including a conic and cylindrical section; said plurality of spindles being disposed in said passageway in aligned relation and including at least an innermost spindle adjacent said closed end, an outermost spindle adjacent said apertured end and an intermediate spindle position between said innermost and outermost spindles; a single thread-like resilient monofilament element wound about a portion of said conic and cylindrical section of each of said spindles to define elastic bodies slideable thereon; fixed means in said housing contacting the elastic body on said innermost spindle and precluding movement thereof in one longitudinal direction with respect to said housing; portions of said innermost and intermediate spindles functioning to limit movement of the elastic bodies on said intermediate and outermost spindles in one longitudinal direction with respect to said housing; and button means extending through the apertured end of said housing whereby said spindles and elastic bodies may be subjected to load conditions.

4. A shock absorber as set forth in claim 3: in which the taper of the conical portion of said conic and cylindrical sections is directly proportional to the force needed to cause the sliding of the elastic body on the conical portion of said conic and cylindrical section.

5. A shock absorber as set forth in claim 4: in which the monofilament elements comprising the elastic bodies are subjected to a predetermined tension at such time as said elastic bodies are fabricated.

References Cited in the file of this patent

UNITED STATES PATENTS

| | | |
|---|---|---|
| 1,772,414 | Brooke-Hunt et al. | Aug. 5, 1930 |
| 2,842,356 | Taylor | July 8, 1958 |
| 2,846,211 | Taylor | Aug. 5, 1958 |
| 2,948,526 | Maier | Aug. 9, 1960 |

FOREIGN PATENTS

| | | |
|---|---|---|
| 315,941 | Great Britain | July 25, 1929 |
| 357,395 | Italy | Mar. 14, 1938 |